United States Patent Office 3,240,052
Patented Mar. 15, 1966

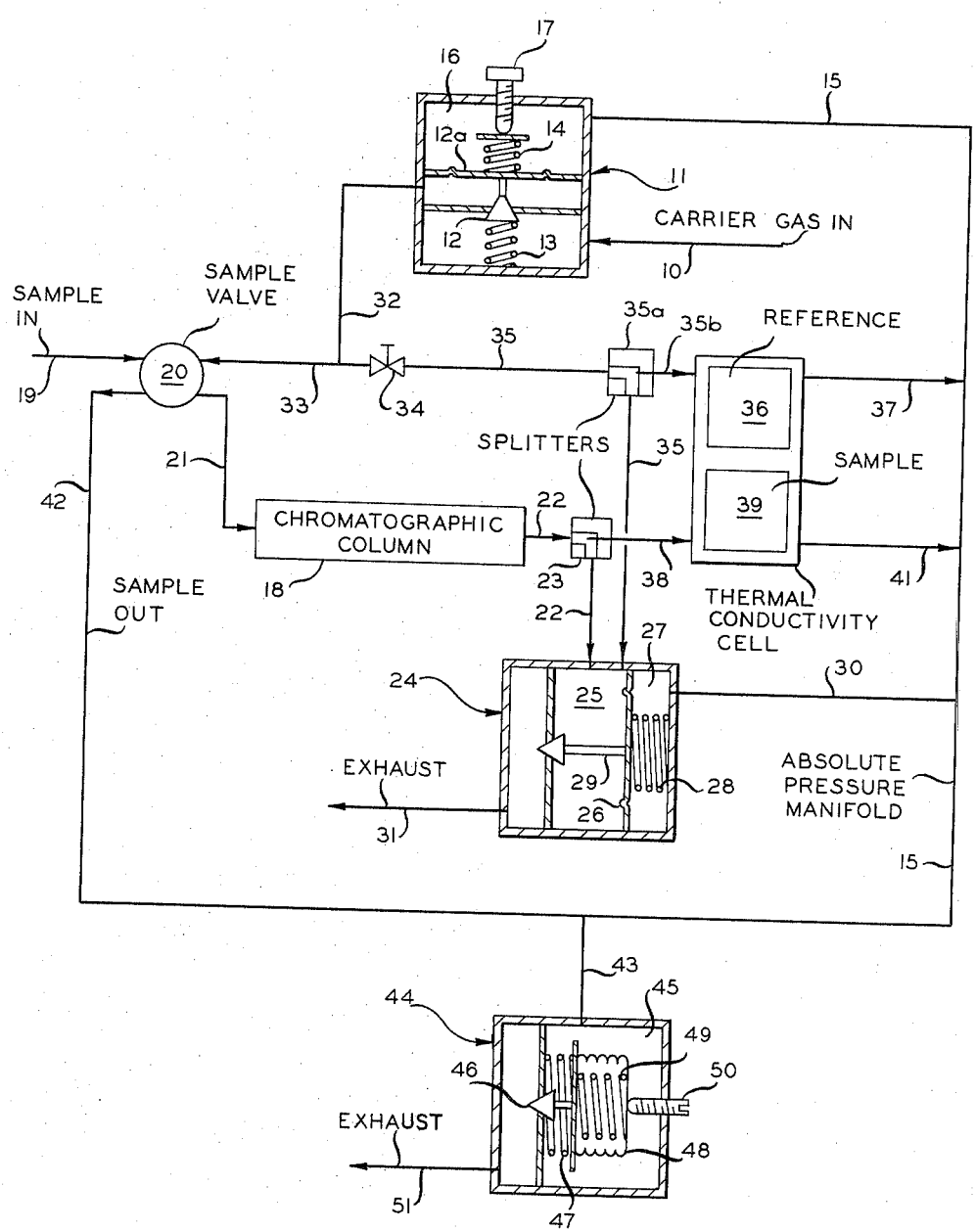

3,240,052
PRESSURE AND FLOW RATE REGULATION IN A FLUID CIRCULATION SYSTEM
Marvin E. Reinecke, Emmerich Guenther, and Lewis B. Roof, Bartlesville, Okla., assignors to Phillips Petroleum Company, a corporation of Delaware
Filed Dec. 31, 1962, Ser. No. 248,542
7 Claims. (Cl. 73—23.1)

This invention is directed to the control of pressure and flow rate in a system containing a flowing fluid. In one aspect the invention is directed to maintaining the flow of fluids constant, particularly in a system where low flow rates and low pressures are employed. In one of its more specific aspects the invention is directed to the control of gas pressure and flow rates in a chromatographic analyzer system.

Adsorption chromatography is a known method for analyzing fluid samples by preferential adsorption and desorption. In a conventional system for adsorption chromatography a column containing appropriate adsorber, usually in granular form, is used to separate the various components of a fluid sample. The fluid can be either a gas or a liquid although the analysis is usually conducted on the sample in gaseous form. The gas sample is introduced to the column as a slug of sample gas in a stream of carrier gas passing continuously through the column. Under the conditions of the analysis the various components of the sample are selectively adsorbed and then selectively desorbed by the continuing stream of carrier gas so that the various components of the sample pass out of the column sequentially where their presence and relative concentration can be detected by appropriate sensing means. Various means for sensing the components of a sample according to their characteristic properties include analyzers adapted to detect and record such properties as thermal conductivity, density, refractive index, infrared absorption, and the like.

The desirability of using chromatography for such specific uses as fractionator (multistage distillation) control has been recognized for some time. Certain features of process chromatography, such as specific measurement, high sensitivity, speed of analysis and simplicity of operation, make this type of analyzer very attractive for use in automatic process control. A thermal conductivity cell is often employed as the means for sensing the presence and concentration of the components of the sample subject to analysis. One advantage of the thermal conductivity cell as a sensing means for detecting the components of a sample is that it is linearly sensitive to the components to about 100 percent whereas other conventional detectors are linearly sensitive to about 10 percent. This allows the detector to measure the part per million peak and the approximately 100 percent peak in a binary mixture. This assumes, however, the absence or near absence of noise generated in the system. Measuring extremely small concentrations of a sample component with a chromatographic analyzer often results in a signal-to-noise ratio which is too low to make amplification of the signal effective. Sources to which the generation of noise can be attributed include temperature changes in the system and changes in the pressure and flow rates of the gaseous streams in the system. Other sources of noise are attributed to power supply, basic thermistor noise and other sources of background noise. This invention is concerned with the elimination or control of noise arising from fluctuations in the pressure and the flow rates of the gases flowing through the chromatographic analyzer apparatus.

It is an object of this invention to provide a method and means for controlling the pressure and flow rates of gases in a chromatographic analyzer so as to reduce or eliminate the generation of noise caused by fluctuations in the pressure and flow rate of a flowing gaseous stream. It is also an object of this invention to provide a system of gaseous flow wherein the pressure in the flowing streams is referenced to an absolute pressure and is completely independent of ambient pressure. The provision of a pressure regulating valve which is referenced to an absolute pressure is still another object of this invention. Other objects and advantages of the invention will be readily apparent to one skilled in the art upon studying the disclosure of the invention including the appended drawing wherein:

The sole figure of the drawing is a schematic representation of a preferred embodiment of the pressure and flow control system of the invention as applied to a chromatographic analyzer.

Referring now to the drawing, a carrier gas is introduced to the analyzer via conduit 10 and flow control valve 11. The flow rate of carrier gas through valve 11 is controlled by the valve stem 12 being balanced by opposing springs 13 and 14 which are referenced to the absolute pressure in conduit 15 supplied to chamber 16 of valve 11. The setting of the flow rate of carrier gas through valve 11 is accomplished by rotating bolt or screw 17. Carrier gas flows through valve 11 constantly. A sample of gas to be analyzed is passed to the analyzer via conduit 19 and is admitted by sample valve 20 operated by a timing device (not shown). The sample is introduced at substantially the same pressure as the reference pressure of conduit 15. The sample passes from the sample valve via conduit 21 to chromatographic analyzer column 18 and the effluent from the column 18 is passed via conduit 22 containing splitter 23 and thence to back pressure regulator valve 24. The pressure of the gas entering chamber 25 of valve 24 is balanced against diaphragm 26 which, in turn, is subjected to the pressure of the absolute manifold 15 which is in communication with chamber 27 via conduit 30, the absolute pressure in manifold 15 being the reference pressure against which coil spring 28 operates to actuate the valve stem 29 so as to exhaust excess gas out of the system via conduit 31. Carrier gas passes from valve 11 via conduits 32 and 33 to sample valve 20 and thence via conduit 21 to chromatographic analyzer column 18. A portion of carrier gas passes through valve 34 and conduit 35 containing splitter 35a and thence to back pressure regulator 24. A capillary tube 35b extends into conduit 35 so as to pass a small amount of carrier gas into reference cell 36 which is then exhausted via conduit 37 into the absolute pressure manifold 15. A capillary tube 38 extends into conduit 22 so as to pass a small amount of column effluent gas continuously into cell 39 which is then exhausted via conduit 41 into absolute pressure manifold 15.

Gaseous sample passed to sample valve 20 is exhausted from sample valve 20 via conduit 42. The exhausted sample passes through conduit 42 which is in open communication with absolute pressure manifold 15 and thence via conduit 43 to back pressure regulator 44. The gas passes into chamber 45 of back pressure regulator valve 44. The needle valve 46 of valve 44 is balanced by coil spring 47 and sealed bellows 48 containing coil spring 49. The absolute back pressure maintained by valve 44 is regulated by rotating bolt or screw 50. Gas is exhausted from valve 44 via conduit 51.

The method and means of the present invention has been found to reduce the noise generated in a chromatographic analyzer system so that extremely small concentrations of a component in a sample can be detected and measured accurately. The noise-to-signal ratio has been reduced so that components in a sample can now be measured which heretofore went undetected because the signal generated by small concentrations was too weak for effective amplification. The noise generated in a system is amplified along with the signal and therefore the noise generated determines the sensitivity of the system.

According to the present invention valves 11 and 24 are referenced to the pressure in absolute pressure manifold 15 and the pressure in manifold 15 is maintained constant by back pressure regulator flow valve 44. The term "referenced to the pressure in absolute pressure manifold 15" means that the space within chamber 16 of valve 11 and the space within chamber 27 of valve 24 is in communication with manifold 15 so that the pressure within those chambers is independent of the movement or flexure of the diaphragm enclosing the chamber; i.e., diaphragm 12a of valve 11 and diaphragm 26 of valve 24. Thus the valves 11 and 24 are independent of ambient pressure changes.

Valve 44 is referenced to the pressure in evacuated, sealed bellows 48 and is also independent of changes in ambient pressure.

The valve stem 46 is balanced by opposing springs 47 and 49 with 49 being contained in bellows 48. The pressure in manifold 15 is set by turning threaded screw 50.

Valve 11 is referenced to the pressure in manifold 15 and the valve stem 12, connected to diaphragm 12a, is balanced between opposing springs 13 and 14. The pressure on conduit 32 is regulated by adjustment of threaded screw 17. The pressure of the carrier gas in conduit 10 is relatively constant, being derived from a cylinder of hydrogen, helium, or the like, with its conventional, associated regulator discharge valve.

Valve 24 is referenced to the pressure in manifold 15 and the valve stem 29, connected to diaphragm 26, is operated by spring 28. Valve 24 operates at a preset back pressure determined by the constant of the spring 28.

The sample to be analyzed is passed to thermal conductivity cell 39 via conduit 22 and stream splitter 23. Splitter 23 comprises a conduit 38 inserted into conduit 22 at substantially its center and with its open end in the path of the flow of sample so that a fraction of the stream passing through conduit 22 flows directly into conduit 38. The sample stream flows through conduit 38 and thermal conductivity cell 39 and then exhausts into manifold 15. Conduit 38 can be sized to pass any selected fraction of the stream in conduit 22 through cell 39. A stream of carrier fluid or gas is passed via splitter 35a and conduit 35b to conductivity cell 36. Conduit 35b is sized to pass a stream substantially equal in volume to that of conduit 38. Thus the flow rates and pressures of the streams flowing through cells 36 and 39 are substantially equal and constant.

The system of the invention as described above has been applied to a chromatographic analyzer utilized in analyzing gaseous streams and the reduction in noise generated within the system has been such that the sensitivity of the analyzer has been increased by a factor of about 100:1. When a thermal conductivity cell is employed as the detector in the above system nonhydrocarbon gases in hydrocarbon mixtures can be measured in concentrations as low as about 4 or 5 p.p.m. whereas in a conventional analyzer concentrations of 400 or 500 p.p.m. were required for measurement. Nonhydrocarbon gases encountered in hydrocarbon mixtures and capable of measurement by the above system employing a thermal conductivity cell detector include hydrogen, nitrogen, oxygen, carbon dioxide, carbon monoxide, helium, and the like. The increase in sensitivity of the system is, of course, applicable to the measurement of low concentrations of individual hydrocarbon components in a hydrocarbon mixture.

In a typical analysis of a hydrocarbon stream with the system hereinbefore described and illustrated in the drawing, the pressures, or pressure ranges, in the various conduits are shown in the following Table I.

*Table I*

[Pressure in pounds per square inch, gage]

| Conduit | 10 | 32 | 35 | 21 | 22 | 36 | 39 | 15 |
|---|---|---|---|---|---|---|---|---|
| Pressure, p.s.i. | 110 | 50 | 2 | 50 | 2 | 1 | 1 | 1 |

The flow through conduits 35b and 38 is maintained constant by maintaining the pressure in conduits 35 and 22 constant.

That which is claimed is:

1. In a chromatographic analyzer comprising
a chromatographic column,
a pair of thermal conductivity cells,
a source of carrier fluid,
a source of fluid sample to be analyzed, and
a sample valve to pass carrier fluid to the column and to interrupt the flow of carrier fluid periodically and to inject a slug of sample into the carrier fluid passing to the column, the combination therewith of
a constant pressure manifold;
a first back pressure regulator valve, referenced to a fluid in a substantially evacuated, sealed bellows, and operatively connected to said manifold so as to maintain the pressure in said manifold constant and to exhaust excess fluid;
a pressure regulator valve operatively connected to said source of carrier fluid and controlled by the pressure in said manifold so as to pass carrier fluid to said sample selector valve and to a first thermal conductivity cell;
a conduit connected to said column so as to remove effluent fluid therefrom;
means to remove a constant portion of said effluent fluid from said conduit and to pass same through the second of said thermal conductivity cells;
means to exhaust said cells into said manifold; and
a second back pressure regulator valve, controlled by the pressure in said manifold, and operatively connected to the conduit which removes effluent from the column so as to maintain the pressure in the conduit constant and to exhaust excess fluid.

2. In a chromatographic analyzer comprising
a chromatographic column,
a pair of thermal conductivity cells,
a source of carrier fluid,
a source of fluid sample for analysis,
means to pass a stream of sample through said column,
means to pass a stream of carrier fluid through one of said cells, and
means to pass a stream of column effluent through the other of said cells, the combination therewith of
a pressure manifold;
means controlled by the fluid pressure in a hermetically sealed chamber to maintain a constant pressure in said manifold and exhaust excess fluid from said manifold; and
means to pass the effluent from each of said cells to said manifold.

3. In a chromatographic analyzer comprising:
a chromatographic column,
a pair of thermal conductivity cells,
a source of carrier fluid,
a source of fluid sample to be analyzed, and
a sample valve to pass carrier fluid to the column and and to interrupt the flow of carrier fluid periodically and then to inject a slug of sample into the carrier fluid passing to the column, the combination therewith of
a constant pressure manifold;
a first back pressure regulator valve, controlled by a fluid in a substantially evacuated, sealed bellows and operatively connected to said manifold so as to maintain the pressure in said manifold constant and to exhaust excess fluid;

a first conduit;

a pressure regulator valve operatively connected to said source of carrier fluid and controlled by the pressure in said manifold so as to pass carrier fluid to said sample valve and to said first conduit;

means to remove a constant portion of carrier gas from said first conduit and pass same through a first conductivity cell;

a second conduit connected to said column so as to remove effluent fluid therefrom;

means to remove a constant portion of said effluent fluid from said second conduit and to pass same through the second of said conductivity cells;

means to exhaust said cells into said manifold; and a second back pressure regulator valve, controlled by the pressure in said manifold, and operatively connected to said first and second conduits so as to exhaust fluid from said conduits at a rate controlled by the pressure in said manifold.

4. The chromatographic analyzer of claim 3 wherein the means to remove a constant portion of carrier gas from said first conduit comprises a first capillary tube extending into said first conduit and operatively connected to said first conductivity cell; and the means to remove a constant portion of effluent fluid from said second conduit comprises a second capillary tube extending into said second conduit and operatively connected to said second thermal conductivity cell.

5. In the method of analyzing a fluid stream which comprises passing a carrier fluid through a chromatographic column, intermittently passing a sample of fluid to be analyzed through said column and then passing the effluent of the column through a detecting means to detect and identify components of said effluent, the improvement comprising controlling the flow rates and pressures of the fluids passing through said column and said detecting means by the fluid pressure in a common zone downstream from said detecting means; and maintaining the pressure in said common zone constant with reference to a hermetically sealed zone.

6. The method of claim 5 wherein a fraction of the effluent from the column is passed through the detector means.

7. In the method of analyzing a fluid stream which comprises passing said stream through a chromatographic column and then passing the column effluent through a detecting means to detect and identify components of said effluent, the improvement comprising controlling the flow rate and pressure of the fluid passing through said column and said detecting means by the fluid pressure in a common zone downstream from the detector; and maintaining the pressure in said common zone constant with reference to a hermetically sealed zone.

References Cited by the Examiner

UNITED STATES PATENTS

| 2,816,561 | 12/1957 | Krueger | 137—81 |
| 3,056,278 | 10/1962 | Guenther | 73—23 |
| 3,068,686 | 12/1962 | Harmon. | |
| 3,087,112 | 4/1963 | Pfifferle | 73—23 |

OTHER REFERENCES

Guild et al.: in Gas Chromatography, Amsterdam, 1958, edited by Desty, Butterworths Scientific Publications, 1958.

National Bureau of Standards Technical News Bulletin, August 1958, pp. 150, 151.

LOUIS R. PRINCE, *Primary Examiner.*

JOSEPH P. STRIZAK, RICHARD QUEISSER,
*Examiners.*